Dec. 9, 1969 S. S. DAMRON 3,483,540

MAGNETIC TAPE RECORDING AND REPRODUCING SYSTEM FOR PROCESSING DIGITAL DATA AT HIGH TRANSFER RATES

Filed June 3, 1966

INVENTOR.
SIDNEY S. DAMRON

BY Robert G. Clay

ATTORNEY

United States Patent Office 3,483,540

Patented Dec. 9, 1969

3,483,540

MAGNETIC TAPE RECORDING AND REPRODUCING SYSTEM FOR PROCESSING DIGITAL DATA AT HIGH TRANSFER RATES

Sidney S. Damron, Los Altos, Calif., assignor to Ampex Corporation, Redwood City, Calif., a corporation of California Filed June 3, 1966, Ser. No. 555,156

Int. Cl. G11b *5/00*

U.S. Cl. 340—174.1 3 Claims

ABSTRACT OF THE DISCLOSURE

An improved rotary instrumentation recording and reproducing apparatus in which a pilot signal having a stable frequency is employed to develop an error signal for correcting time base errors. The input signal may be converted to a non-return-to-zero format at a predetermined clock rate in synchronism with the pilot signal and subsequently frequency modulates a carrier. Means are included for combining the frequency modulated information signal and pilot signal to provide a composite signal. Upon reproduction the data information and pilot are synchronous such that the data may be clocked in synchronism with the source of the pilot without clock errors.

Figure 1:
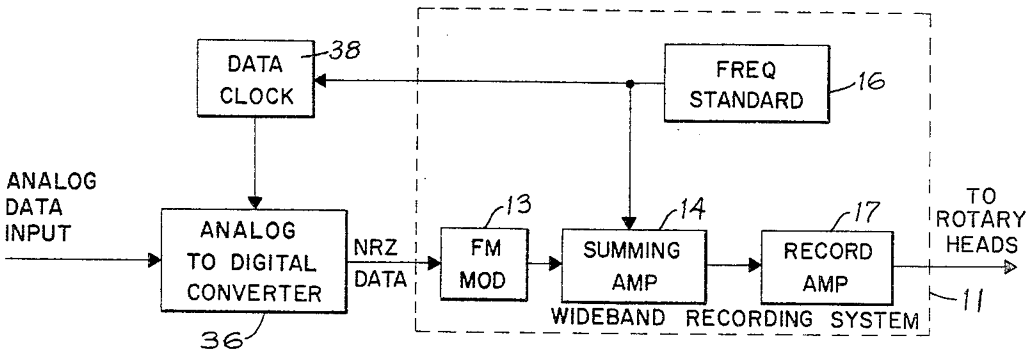

This invention relates generally to the recording of digital data on magnetic tape and reproduction of the data therefrom, and is more particularly directed to a system of this type for processing the data at a high transfer rate with no clock errors.

Wideband rotary head instrumentation recorders are advantageously employed for the storage and reproduction of digital data because of the extended bandwidth, high degree of time-base stability, low flutter, and high storage density obtainable therewith. One such recording and reproduce system is disclosed in a copending application of Kietz et al., Ser. No. 137,368, now United States Patent 3,304,377 assigned to the assignee of the present application. Basically this system includes a rotary drum having circumferentially spaced record heads mounted thereon which are swept with great velocity transversely across a slowly moving tape to record an array of discontinuous tracks across its width. At the beginning and end of each track some of the information is recorded redundantly. As a particularly important feature of the system, means are provided for combining with the recorded signal information, a pilot signal derived from a very stable frequency standard. The pilot signal experiences the same timing errors as the recorded signal information, and during the reproduce mode, the pilot signal is extracted and compared to the stable frequency standard in order to derive an error signal representative of the timing errors. The error signal is utilized to precisely control the angular position of the head drum and the delay of voltage variable delay lines through which the reproduced information is passed in such manner as to provide time-base correction of the reproduced information relative to the frequency standard. The time corrected signals coming sequentially from the rotating heads are nearly phase-coherent during the redundancy periods and can therefore be combined by means of a slow switcher arrangement to provide a continuous signal free of transients.

Heretofore, when a system of the foregoing type has been utilized to store and reproduce digital data, a three-level return-to-zero format digital signal has been typically employed in the process. The digital signal frequency modulates a carrier to provide the signal which is combined with the pilot signal prior to recording. In the reproduce mode, after recovery of the carrier from the tape and sequential recombination of the signals from the respective head channels, the recombined carrier is limited and demodulated, and the resulting pulses reshaped into the original return-to-zero form by pulse-shaping circuitry. Use of the three level return-to-zero digital format has been previously preferred because of its self-clocking features, i.e., a transition between signal levels occurs for each bit of the signal. Despite such self-clocking, if a tape dropout occurs, clock as well as data errors occur. From the standpoints of the data rate that may be used for a given bandwidth and the dynamic range for a transition, a non-return-to-zero digital format offers significant advantages over the three level return-to-zero format. More particularly, the non-return-to-zero code provides twice the transfer rate for a given bandwith and twice the dynamic range for a transition as those attainable with the return-to-zero code. However, the non-return-to-zero signal except for special cases is not self-clocking.

It is an object of the present invention to provide a magnetic record/reproduce system for the processing of digital data with significantly increased data rates and no clock errors.

Another object of the invention is to provide for the synchronous clocking of non-return-to-zero digital data processed in a rotary head, transverse scan, transient-free, wideband instrumentation recording and reproducing system of the type wherein a pilot signal is employed to develop an error signal for correcting time base errors.

Still another object of the invention is the provision of a magnetic recording and reproduce system for processing non-return-to-zero digital data wherein the pilot and data information are synchronous and the data clock information is carried by the pilot such that upon reproduction the data may be clocked in synchronism with the source of the pilot without clock errors.

It is a further object of the invention to provide a system of the class described for facilitating the processing of non-return-to-zero digital data without clock error in existing wideband instrumentation recorders and reproducers with but minor modification thereof.

Figure 2:
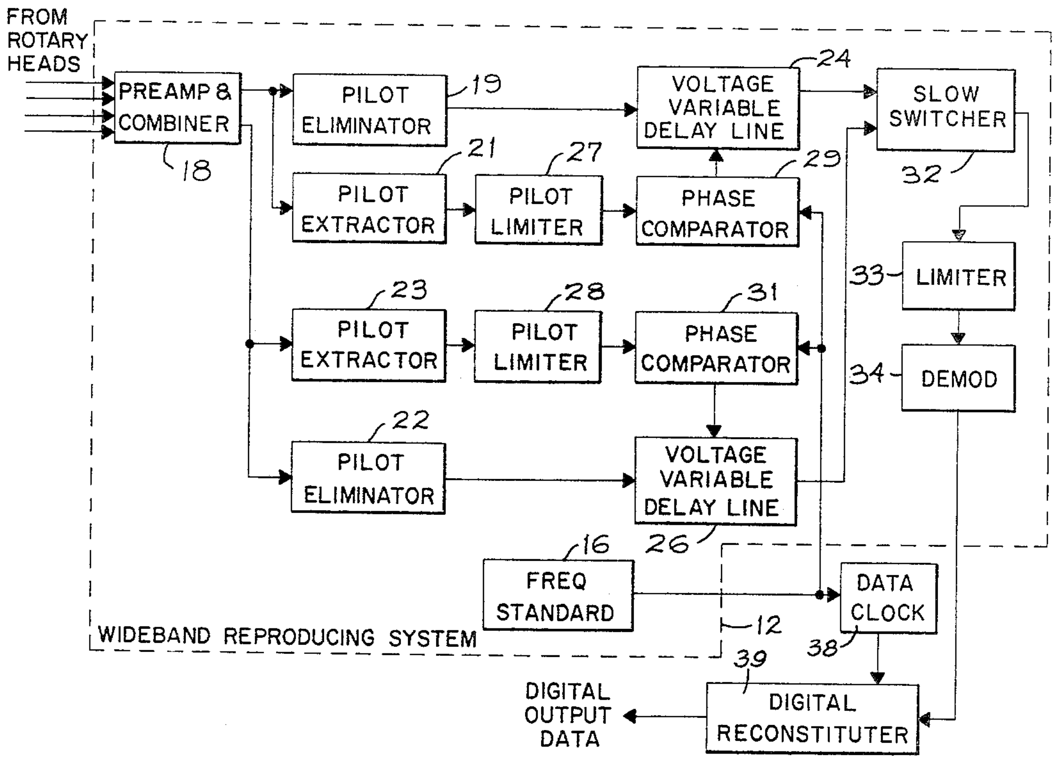

Additional objects and advantages of the invention will become apparent upon consideration of the following description thereof in conjunction with the accompanying drawing, wherein:

FIGURE 1 is a block diagram of the record portion of a digital data processing system in accordance with the present invention; and FIGURE 2 is a block diagram of the reproduce portion of the system.

Referring now to the drawings, there will be seen to be provided wideband rotary head instrumentation recording and reproducing apparatus including a recording system 11 and a reproducing system 12 of the type disclosed in the copending application Ser. No. 137,368, of Kietz et al., now United States Patent 3,304,377. In basic respects, the recording system includes an FM modulator 13 which converts an input signal to a frequency modulated signal and applies same to one input of a summing amplifier 14. A frequency standard 16 applies a pilot signal having a very stable frequency to a second input of the summing amplifier 14, and the output of such amplifier which includes the frequency modulated signal and pilot signal is applied by a record amplifier section 17 to the rotary heads of the recorder. As is well known in the art, the heads are mounted at circumferentially spaced points of a rotary drum which sweeps the heads in sequence transversely across a longitudinally moving tape. Typically there are provided four heads spaced at 90° intervals about the drum to record an array of discontinuous tracks across the width of the tape. In addition, the guiding arrangement for the tape is such as to provide for the recording of the signal redundantly at the beginning and end of each track. In other words, just prior to a given head completing scanning of a track on the tape, the following head begins scanning of the next successive track on the tape. Inasmuch as the pilot signal is recorded simultaneously with the frequency modulated information signal, both signals experience the same timing errors. The reproducing system 12 may be thus arranged to extract the pilot signal and develop an error signal therefrom for correcting timing errors in the reproduced information signal.

To facilitate correction of the timing errors by means of the pilot signal, the reproducing system 12 includes a preamplifier and combiner 18 having a plurality of inputs respectively receiving the signal reproduced by the rotary heads in sequence. The preamplifier and combiner 18 functions to combine the signals from alternate heads to produce combined signals in first and second output channels. More particularly, with four 90° displaced heads consecutively numbered 1, 2, 3, 4, the reproduced signals from heads 1 and 3 appear in the first output channel and the reproduced signal from heads 2 and 4 appear in the second output channel. The first output channel is commonly connected to the inputs of a pilot eliminator 19 and a pilot extractor 21, while the second output channel is similarly commonly connected to the inputs of a pilot eliminator 22 and a pilot extractor 23. The eliminators and extractors function to separate the pilot and information signals appearing in the first and second output channels. The information signals from the respective output channels appear at the outputs of the pilot eliminators 19 and 22 and are applied to voltage variable delay lines 24 and 26. The pilot signals from the respective output channels appear at the outputs of the extractors 21 and 23 and are preferably limited, as by means of pilot limiters 27 and 28, prior to being applied to first inputs of phase comparators 29 and 31. Second inputs of the phase comparators are energized by the very stable frequency signal of the frequency standard 16, or a different frequency standard operating at the same frequency in the event the recording and reproducing systems 11 and 12 are provided as separate units. The phase comparators develop error voltages proportional to phase differences between the reproduced pilot signals and the frequency standard. The error voltages are thus representative of timing errors experienced by the pilot signal and therefore the information signal during the recording and reproducing processes. The timing errors are relatively small inasmuch as the reproducing system 12 conventionally includes a servo system (not shown) for controlling the angular position of the head drum in accordance with the pilot signal to thereby provide a coarse correction of timing error. The error voltages developed by the phase comparators 29 and 31 afford a fine correction of the timing errors in the information signal. In this regard, the error voltages are applied to control inputs of the voltage variable delay lines 24 and 26 to vary the phase shift imparted to the information signals applied to such lines in inverse relation to the error voltages. The timing errors in the portions of the information signal transmitted by the first and second channels are thereby substantially precisely compensated.

The time corrected signals at the outputs of the delay lines 24 and 26 have substantially the same phases they had prior to recording and are nearly phase-coherent during the redundancy periods. As a result, the delay line signals are applied to the inputs of a slow switcher 32, are therein combined in a transient-free manner during the redundancy periods to provide a continuous signal at the output of the switcher. This continuous signal is applied to a limiter 33, and the limited signal is in turn applied to a demodulator 34 from which a signal is derived that is substantially a replica of the original signal applied to the recording system 11 for recording.

When a conventional recording and reproducing arrangement of the type hereinbefore described has been utilized for the storage and reproduction of digital data, it has been the usual practice to process the data with a three level return-to-zero format because of the self-clocking characteristics thereof. More particularly, the information signal is converted to return-to-zero digital form prior to its application to the the FM modulator 13 of the recording system 11 of recording on tape. Retrieval of the information recorded on the tape is accomplished by means of the reproducing system 12, the output of the demodulator 34 being applied to pulse shaping circuitry to produce the return-to-zero digital data. As noted previous, use of a non-return-to-zero digital format provides twice the transfer rate for a given bandwidth and twice the dynamic range for a transition as are attainable with a return-to-zero code, however a non-return-to-zero digital signal with an auxiliary data clock has resulted in clocking errors by virtue of the clock being non-synchronous with the signal.

In accordance with the present invention the advantages of a non-return-to-zero digital format are preserved while the clocking difficulties are overcome to provide clock error-free processing non-return-to-zero digital data with the recording and reproducing systems 11 and 12. In the record mode, non-return-to-zero data is clocked by a signal which is synchronous with the pilot output of the frequency standard 16. The digital data, clock, and the pilot signal are thus synchronous. During the reproduction of the data by the reproducing system 12, since the pilot is at all times synchronous with the frequency standard, so is the digital data. When a tape dropout occurs, both the pilot and data are momentarily lost, but after the dropout is over the data and pilot reappear in synchronism with the frequency standard. Therefore, in accordance with a very important feature of the invention, error free clocking of the reproduced non-return-to-zero data is simply effected by means of a data clock operating in synchronism with the frequency standard.

Considering now the data storage and reproducing system outlined above in greater detail, an analog to digital converter 36 is coupled to the FM modulator 13 to convert an analog data input signal to non-return-to-zero digital form. The converter may be of any type well known in the art for converting an analog signal to a non-return-to-zero digital signal having a transfer rate determined by a clock signal applied to a clock input thereof. The clock input of the converter is driven by a data clock 38 which is coupled to the frequency standard 16 for the purpose of synchronization. Typically, the clock generates pulses at a rate which is a multiple of the frequency of the pilot signal generated by the frequency standard, the clock pulses being in synchronism with the pilot signal. As a result, the non-return-to-zero digital data output of the converter 36 as modulated by the FM modulator 13 and added to the pilot signal by the summing amplifier 14 is in synchronism with the pilot signal. Hence, the signal recorded on the tape includes the frequency modulated non-return-to-zero digital data signal in synchronism with the pilot signal, and both signals are synchronous with the frequency standard 16. In the reproduce mode, the frequency standard is employed as the system clock, and since the frequency standard has no errors, the clock has no errors. In this regard, the output of demodulator 34 of the reproducing system 12 is coupled to a digital reconstituter 39, which may be of various types well known in the art. A clocking input of the reconstituter is coupled in receiving relation to the data clock 38 such that the reproduced output data applied to the reconstituter is clocked by the clock signal. As in the case of the record mode, the frequency standard 16 is coupled in synchronizing relation to the clock whereby the clock signal is synchronous with the frequency standard, and therefore with the reproduced data. Error-free clocking of the data applied to the reconstituter is thus obtained and the original non-return-to-zero data is derived from the output of the reconstituter.

It will of course be appreciated that the data clock and frequency standard employed in the reproduce mode need not be the same as those employed in the record mode. In this regard, the recording and reproducing systems are, in some instances, provided as separate units. Similar, but separate data clocks and frequency standards are then employed with the respective systems.

Although the invention has been described hereinbefore with respect to a single preferred embodiment, it will be appreciated that various changes and modifications may be made therein without departing from the spirit and scope of the invention, and thus it is not intended to limit the invention except by the terms of the following claims.

What is claimed is:

1. In a rotary head wideband instrumentation recording and reproducing apparatus having a recording system including an FM modulator for receiving an information signal, a frequency standard for generating a pilot signal having a stable frequency, means coupled to said modulator and said frequency standard for combining the frequency modulated information signal and pilot signal therefrom to provide a composite signal, means for applying the composite signal to rotary heads for transverse recording of the composite signal on magnetic tape; and having a reproducing system including means for receiving segments of the composite signal reproduced from the tape sequentially from the rotary heads and combining the segments of the signal from alternate heads to appear in separate channels, means coupled to each channel for separating the information and pilot portions of the signal segments therein, a voltage variable delay line receiving the information portion of the signal segments in each channel, a phase comparator having a first input coupled in receiving relation to the pilot portion of the signal segments in each channel and a second input coupled in receiving relation to said frequency standard for generating an error voltage proportional to phase departures between said pilot signal and the signal from said frequency standard, said error voltage applied to said delay line to vary the phase thereof in compensatory relation to said phase departures, means coupled to the outputs of said delay lines for combining the information portion of the signal segments in the respective channels to provide a continuous reproduced frequency modulated information signal, and a demodulator coupled to the combining means to demodulate the continuous reproduced signal, in combination with digital data processing means in the recording system having converter means for converting an analog information input signal to a non-return-to-zero digital data information signal at a predetermined clock rate and applying the digital data information signal to said FM modulator, means coupled to said converter means for clocking same in synchronism with said frequency standard whereby said digital data information signal is in synchronism with said pilot signal, digital reconstituting means in the reproducing system coupled to said demodulator for reconstituting the digital data information signal at said predetermined clock rate from the demodulated continuous reproduced signal, and means coupled to said reconstituting means for clocking same in synchronism with said frequency standard.

2. Apparatus according to claim 1, further defined by said means coupled to said converter means for clocking same in synchronism with said frequency standard comprising a data clock coupled to a clocking input of said converter means to apply a clock signal thereto, said frequency standard being coupled in synchronizing relation to said data clock.

3. Apparatus according to claim 2, further defined by said means coupled to said reconstituting means for clocking same in synchronism with said frequency standard being said data clock with said frequency standard coupled in synchronizing relation thereto.

References Cited

UNITED STATES PATENTS

| | | | |
|---|---|---|---|
| 2,946,044 | 7/1960 | Bolgiano | 340—347 |
| 3,188,615 | 6/1965 | Wilcox | 340—174.1 |
| 3,304,377 | 2/1967 | Kietz | 179—100.2 |

BERNARD KONICK, Primary Examiner

GARY M. HOFFMAN, Assistant Examiner

U.S. Cl. X.R.

179—100.2